Dec. 4, 1928.
N. WOLKOWICH
STRAINER
Filed Jan. 7, 1928   2 Sheets-Sheet 2
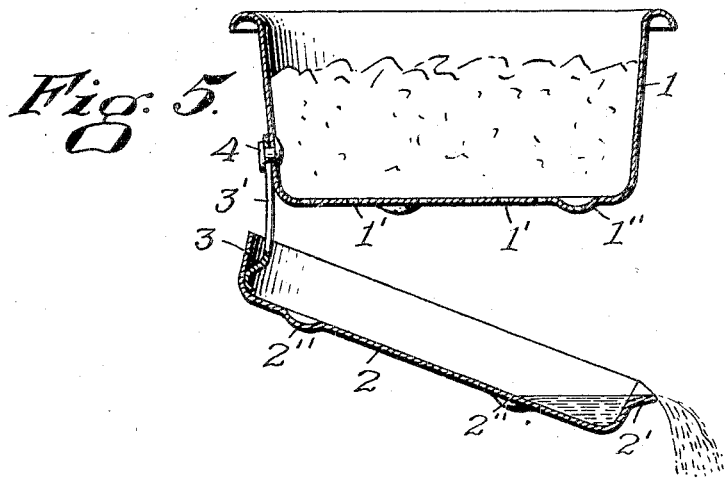
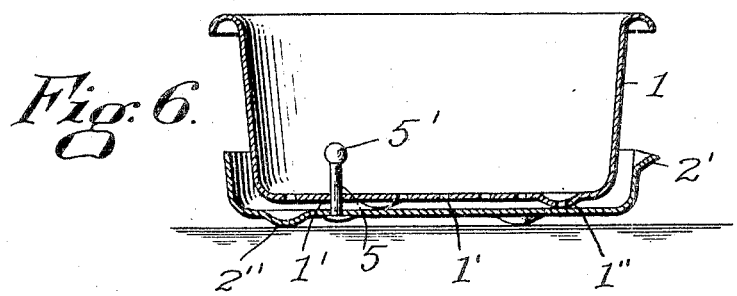
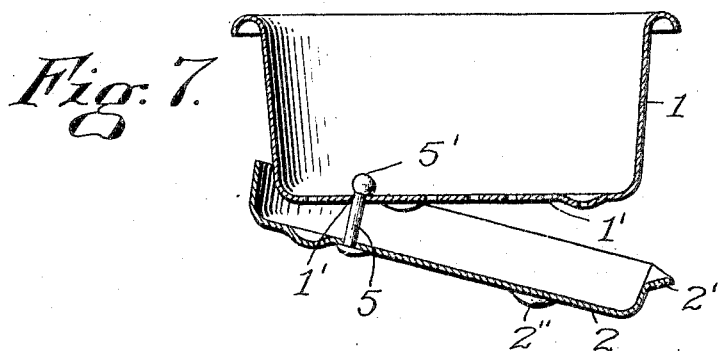
Inventor
Natalie Wolkowich
by John E. Dewey
attorney Patented Dec. 4, 1928.

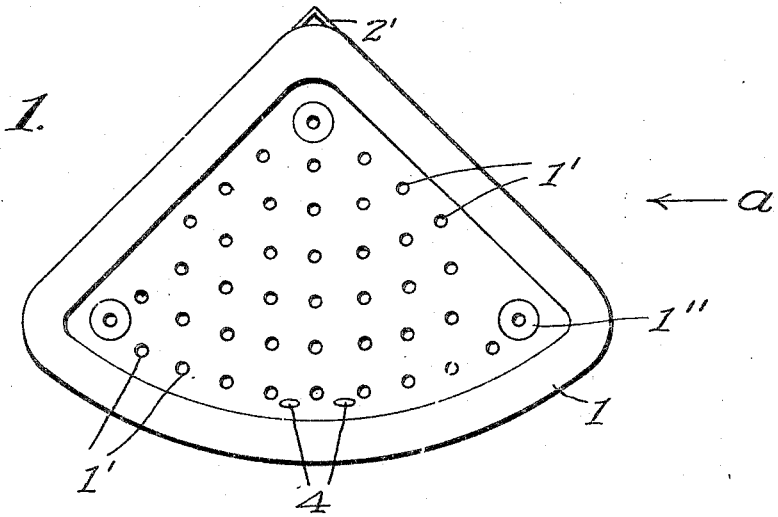
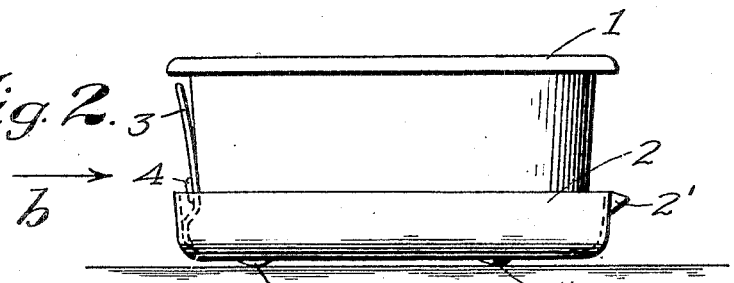
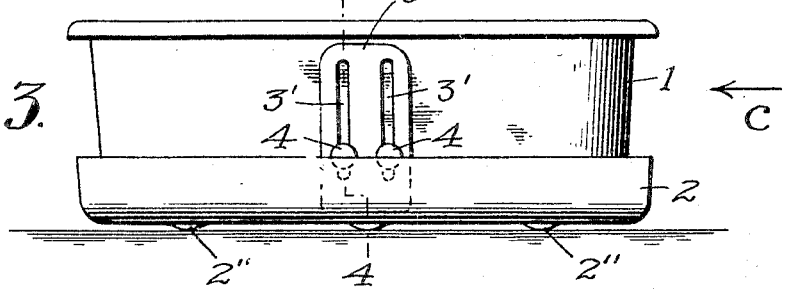
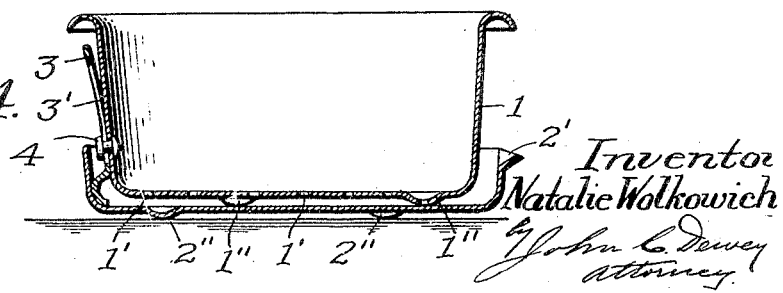

1,694,088

UNITED STATES PATENT OFFICE.

NATALIE WOLKOWICH, OF WORCESTER, MASSACHUSETTS.

STRAINER.

Application filed January 7, 1928. Serial No. 245,127.

My invention relates to a strainer, and more particularly to a sink strainer, made of sheet metal, or wire, with perforations through the bottom, and also through the sides, if desired, through which perforations the liquid passes.

The object of my invention is to combine with a strainer, particularly a sink strainer of any ordinary construction, a pan or saucer without any perforations therein, which acts to receive and retain the liquid passing through the perforations in the strainer. The supplemental pan or saucer is movably connected with the strainer in such a manner that it may be moved away from the strainer, and tilted in an inclined direction to allow the liquid received from the strainer to be poured from the pan or saucer.

In the use of an ordinary strainer, particularly a sink strainer, provided with perforations for the passage of liquid, in moving the strainer from the sink to a receptacle to receive the contents of the strainer, some of the liquid, not strained from the strainer into the sink, is liable to drip on the floor, or other surfaces, making it necessary to wipe or mop up this liquid.

In my improved sink strainer, I combine with the strainer proper, a supplemental pan or saucer without any perforations therein, to receive the liquid or drippings from the strainer and prevent them from going on the floor, or other surfaces, when moving the strainer to discharge the contents thereof. The supplemental pan or saucer is so connected with the strainer that it can be moved relative thereto, and tilted so as to discharge the liquid or drippings contained therein, as will be hereinafter fully described.

Referring to the drawings:—

Fig. 1 is a plan view of a strainer of my improved construction.

Fig. 2 is a side view, looking in the direction of arrow $a$, Fig. 1.

Fig. 3 is a view looking in the direction of arrow $b$, Fig. 2.

Fig. 4 is a section, on line 4, 4, Fig. 3, looking in the direction of arrow $c$, same figure.

Fig. 5 corresponds to Fig. 4, but shows the supplemental pan or saucer in its lowered position.

Fig. 6 corresponds to Fig. 4, but shows a modified construction of the strainer, and, Fig. 7 corresponds to Fig. 5, but shows the construction of the strainer shown in Fig. 6.

In the accompanying drawings, 1 is a strainer, which in this instance is made of sheet metal, and of triangular shape, as shown, with perforations 1' through the bottom thereof. The strainer 1 has projections or knobs 1'' on its lower surface, as shown.

Combined with the strainer 1, which may be of any ordinary or desired construction, and made of sheet metal, or wire, or other material with perforations therein, is my supplemental pan or saucer 2, which is preferably made of sheet metal, without any perforations therein, and with the nozzle 2' on one edge thereof, and with knobs or projections 2'' on the underside thereof. The pan or saucer 2 is made a little larger than the bottom of the strainer 1, so that the bottom of the strainer will extend within the pan or saucer 2, as shown in the drawings.

The pan or saucer 2 is movably connected with the strainer 1 in such a manner that the strainer 1 can be raised up from the pan or saucer 2, and the pan or saucer 2 tilted in an inclined direction, to allow the liquid therein to be poured out from the pan or saucer 2, as shown in Fig. 5.

In Figs. 1, 2, 3, and 4, the pan or saucer 2 is permanently connected with the strainer 1 by means of a slotted arm or plate 3, secured by soldering or otherwise, at its lower end to one side of the pan or saucer 2. The arm or plate 3 has elongated slots 3' therein, through which extend headed rivets 4, secured to the side of the strainer 1, as shown in Fig. 5.

In Figs. 6, and 7 is shown a modified construction of the manner of attachment of the strainer 1 to the pan or saucer 2. In said figures, a pin or stud 5, secured to the bottom of the pan or saucer 2, extends loosely through one of the perforations 1' in the bottom of the strainer 1, and has in this instance a rounded end 5' thereon. The movement of the pin or stud 5, extending loosely through a perforation or opening in the bottom of the strainer 1, allows the pan or saucer 2 to be movably connected with the strainer 1, and to be moved into an inclined position, as shown in Fig. 7.

It will be understood that the details of construction of my improved strainer may be varied if desired.

The strainer itself may be of different shapes, and may be made of sheet metal, aluminum, wire, or other suitable material, and may have perforations through the bottom, and also through the sides, if desired. The supplemental pan or saucer may be made of sheet metal, or other suitable material, without any perforations therein, and may be movably attached to the strainer in any suitable manner.

From the foregoing it will be understood that the invention affords a compact and convenient construction whereby the object of the invention, as hereinbefore stated, may be carried into effect. By permanently but movably connecting the strainer receptacle and the drip pan together in such a way that the strainer receptacle may be raised from the drip pan, or the drip pan be lowered from the strainer receptacle, when said pan is to be emptied, any danger of losing the latter will be avoided; and by providing the drip pan on one side with a pour-out nozzle which is remote from the movable connection between said drip pan and the strainer receptacle the loose connection between these parts will enable them to be separated and the drip pan tilted when the drippings are to be poured out. Also by making the two parts of the device of approximately the same size or extent horizontally a compact and convenient combined strainer receptacle and drip pan is provided.

Having thus described my invention, what I claim as new and desire to secure by Letters Patent is:—

1. The combination with a strainer receptacle member having a perforated bottom, of a drip pan member adjustably and tiltably connected to the said strainer receptacle at or near one side, so that said receptacle and pan may be moved vertically relatively to each other to permit the said strainer receptacle to be widely separated from said pan and then tilted when the drippings in said pan are to be poured out.

2. The combination with a strainer receptacle having a perforated bottom, of a drip pan permanently but movably and tiltably connected to the said strainer receptacle so that said receptacle and pan may be moved vertically relatively to each other to permit the said strainer receptacle to be raised from said pan when the drippings in said pan are to be poured out, said drip pan having a pour-out nozzle at one side, and the movable tilting connection between said pan and strainer receptacle being at or near the opposite side of said pan.

3. The combination with a strainer receptacle having one or more headed rivets at one side, of a drip pan having at one side an attached plate having one or more slots loosely receiving said rivet or rivets so that said receptacle and pan may be moved vertically relatively to each other to permit the said strainer receptacle to be raised from said pan, and then permitting said pan to be tilted when the drippings in said pan are to be poured out, said drip pan having a pour-out nozzle at its side opposite the slotted plate; whereby said strainer receptacle and pan may be widely separated from each other and said pan then be tilted to discharge its contents.

NATALIE WOLKOWICH.